United States Patent
Buganza

(10) Patent No.: US 10,002,603 B2
(45) Date of Patent: Jun. 19, 2018

(54) SYSTEM AND METHOD FOR ACTIVELY INFLUENCING SOUND

(71) Applicant: Eberspächer Exhaust Technology GmbH & Co. KG, Neunkirchen (DE)

(72) Inventor: Federico Buganza, Esslingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 0 days. days.

(21) Appl. No.: 15/479,946

(22) Filed: Apr. 5, 2017

(65) Prior Publication Data

US 2017/0294182 A1    Oct. 12, 2017

(30) Foreign Application Priority Data

Apr. 6, 2016 (DE) .................. 10 2016 106 325
Apr. 6, 2016 (DE) .................. 10 2016 106 326
Oct. 31, 2016 (WO) ................ PCT/EP2016/076249

(51) Int. Cl.
*G10K 11/178* (2006.01)
*G06F 3/16* (2006.01)

(52) U.S. Cl.
CPC .......... *G10K 11/1788* (2013.01); *G06F 3/165* (2013.01); *G10K 2210/112* (2013.01);
(Continued)

(58) Field of Classification Search
CPC ......... G10K 2210/12822; G10K 11/22; G10K 11/175; G10K 2210/3026; G10K 2210/51;
(Continued)

(56) References Cited

U.S. PATENT DOCUMENTS

2005/0024134 A1    2/2005  Bolz et al.
2005/0207585 A1    9/2005  Christoph
(Continued)

OTHER PUBLICATIONS

Kuo S Met al: "Active Noise Control: A Tutorial Review", Proceedings of the IEEE, IEEE. New York, US, Bd. 87, Nr. 6, I. Jun. 1999 (Jun. 1, 1999), Seiten 943-973, XP011044219.
(Continued)

*Primary Examiner* — Mohammad Islam
(74) *Attorney, Agent, or Firm* — McGlew and Tuttle, P.C.

(57) ABSTRACT

A system has a sound generator (20) that generates superimposed sound to a sound to be manipulated. An error sensor (50) measures sound and outputs a corresponding feedback signal (e'(n)). A signal generator (91) generates a sound signal (y(n)). A controller (92) generates a control signals ($\lambda_1(n)$) and ($\lambda_2(n)$). The adder (94) subtracts one control signal ($\lambda_2(n)$) from the feedback signal (e'(n)) and outputs a modified feedback signal (en(n)) to the signal generator (91). A weighter (95) weights the sound signal (y(n)) with the control signal ($\lambda_1(n)$) and outputs the weighted sound signal (y'(n)). The generated sound signal (y(n)) is a function of the modified feedback signal (e(n)). The controller (92) generates the control signals ($\lambda_1(n), \lambda_2(n)$) such that a value of the amplitudes of the feedback signal ($\|e'(n)\|$) corresponds to a predefinable value ($\Delta$).

22 Claims, 8 Drawing Sheets

(52) U.S. Cl.
CPC ............... *G10K 2210/12822* (2013.01); *G10K 2210/3014* (2013.01); *G10K 2210/3026* (2013.01); *G10K 2210/30232* (2013.01)

(58) Field of Classification Search
CPC ........... G10K 11/1782; G10K 11/1788; G10K 11/178
See application file for complete search history.

(56) References Cited

U.S. PATENT DOCUMENTS

| | | | | |
|---|---|---|---|---|
| 2013/0013147 A1* | 1/2013 | Luecking | ................ | F01N 1/065 701/36 |
| 2013/0142352 A1* | 6/2013 | Koch | ....................... | H04R 1/22 381/86 |
| 2014/0321659 A1* | 10/2014 | Buganza | ................ | F01N 1/065 381/71.4 |
| 2014/0376733 A1* | 12/2014 | Pommerer | ............. | H04R 3/002 381/71.4 |
| 2015/0060192 A1* | 3/2015 | Wink | ...................... | F01N 13/08 181/245 |
| 2015/0230012 A1* | 8/2015 | Schadler | ................. | H04R 1/02 381/86 |

OTHER PUBLICATIONS

Liang Wang and Woon-Seng Gan, "Convergence Analysis of Narrowband Active Noise Equalizer System under Imperfect Secondary Path Estimation", IEEE Transactions on Audio, Speech, and Language Processing, vol. 17, Issue 4, May 2009, pp. 1-7.

* cited by examiner

SYSTEM AND METHOD FOR ACTIVELY INFLUENCING SOUND

CROSS REFERENCE TO RELATED APPLICATIONS

This application claims the benefit of priority under 35 U.S.C. § 119 of German Applications 10 2016 106 325.8, filed Apr. 6, 2016, 10 2016 106 326.6, filed Apr. 6, 2016, and International Application PCT/EP2016/076249 of Oct. 31, 2016, the entire contents of which are incorporated herein by reference.

FIELD OF THE INVENTION

The present invention pertains to a system and to a method for actively influencing sound. The sound to be influenced may be carried, for example, in an exhaust system or an intake system of an internal combustion engine of a vehicle. The internal combustion engine now represents the noise source of the sound to be influenced.

BACKGROUND OF THE INVENTION

Exhaust systems for internal combustion engines are conventionally built of components through which exhaust gas flows, on the whole, in all operating situations and together form the exhaust system. These components may be, in addition to one or more line sections, for example, one or more turbo chargers, one or more catalytic converters and/or one or more mufflers. Air correspondingly flows through exhaust systems for internal combustion engines in all operating situations, and exhaust systems usually have one or more filters, valves and compressors.

Exhaust systems and intake systems have recently started to be complemented by systems for actively influencing noise carried in the exhaust system or intake system, which can be attributed to the operation of an internal combustion engine. Such systems superimpose the noise, which is being carried in the exhaust system or intake system and is generated essentially by the internal combustion engine, with artificially generated sound waves, which muffle or change the noise being carried in the exhaust system or intake system. As a result, a sound released to the outside of the exhaust system or intake system shall fit the image of a particular manufacturer, appeal to customers and comply with legally required limit values.

This is achieved by at least one sound generator being provided, which is in fluidic connection with the exhaust system or intake system, and thus radiates sound into the interior of the exhaust system or intake system. This artificially generated primary sound and the secondary sound generated by the internal combustion engine are superimposed to one another and leave the exhaust system or the intake system together. Such systems may also be used for muffling. To achieve complete destructive interference of the waves of the noise being carried in the exhaust system or intake system, and of the sound generated by the sound generator, the sound waves originating from the loudspeaker must correspond in terms of amplitude and frequency to the sound waves being carried in the exhaust system or intake system, but have a phase shift of 180° relative to these. Even if the primary sound waves, which are being carried in the exhaust system or intake system and can be attributed to the operation of the internal combustion engine, and the secondary sound waves generated by the loudspeaker correspond to each other in terms of frequency and have a phase shift of 180° relative to each other, but the sound waves do not correspond to each other in terms of the amplitude, there will only be an attenuation of the noise emitted from the exhaust system or intake system.

An exhaust system with a system for actively influencing sound being carried in the exhaust system from the state of the art will be described below with reference to FIGS. 1 and 2:

An exhaust system 4 with a system 7 for actively influencing primary sound being carried in the exhaust system 4 has a sound generator 3 in the form of a sound-insulated housing, which contains a loudspeaker 2 and is connected to the exhaust system 4 in the area of a tail pipe 1 via a sound line. The tail pipe 1 has an orifice 8, which releases exhaust gas being carried in the exhaust system 4 and airborne sound being carried in the exhaust system 4 to the outside. An error microphone 5 is provided at the tail pipe 1. The error microphone 5 measures sound in the interior of the tail pipe 1. This measurement by means of the error microphone 5 takes place in a section located downstream of a mixing area in which the sound line opens into the exhaust system 4, and the fluidic connection is thus established between the exhaust system 4 and the sound generator 3. The term "downstream" is related here to the direction of flow of the exhaust gas in the tail pipe 1 of the exhaust system 4. The direction of flow of the exhaust gas is indicated by arrows in FIG. 2. Additional components of the exhaust system 4, for example, a catalytic converter and a muffler, may be provided (not shown) between the area of the fluidic connection of the exhaust system 4 and the sound generator 3, and the internal combustion engine 6. The loudspeaker 2 and the error microphone 5 are connected each to a control unit 9. Further, the control 9 is connected to an engine control unit 6' of an internal combustion engine 6 via a CAN bus. The internal combustion engine 6 further has an intake system 6". Based on sound measured by the error microphone 5 and operating parameters of the internal combustion engine 6, which are received via the CAN bus, the control 9 calculates for the loudspeaker 2 a secondary sound signal, which will generate a desired overall noise when superimposed to the primary sound being carried in the interior of the tail pipe 1 of the exhaust system 4, and emits this secondary sound at the loudspeaker 2. The control unit 9 may use, for example, a filtered-x least mean squares (FxLMS) algorithm and attempt to have a feedback signal/error signal measured by means of the error microphone go to zero by outputting secondary sound via the loudspeaker (in case of sound cancellation) or to go to a predefined threshold value (in case of sound influencing). Another bus system may also be used instead of a CAN bus.

The mode of operation of the control will be explained in more detail below with reference to FIGS. 3 through 5 based on the example of an active noise cancellation (ANC) control.

Many noises, which are generated by machines, for example, internal combustion engines, compressors or propellers, have periodic components. By monitoring the machine in question with a suitable sensor (e.g., tachometer), it is possible to provide a time-dependent input wave vector $x(n)$, which has a dependence on the basic frequency and the predominant harmonics of the noise of the machine. For example, the exhaust gas back pressure, the mass flow of the exhaust gas, the temperature of the exhaust gas, etc., may be involved in this dependence and the input wave vector. Many machines generate noises of different basic frequencies; these are often called engine harmonics.

This time-dependent input wave vector $x(n)$ has parameters, as is shown in FIG. 3, that have an influence on the signal generated by the noise source according to an unknown z-transformed transfer function $P(z)$ of the noise source $d(n)$ (the signal corresponding to generated primary noise to be superimposed). The time-dependent input wave vector $x(n)$ is used by the control algorithm of a system for actively influencing sound (called "ANC core" in FIGS. 3, 4A, 4B and 6A) for generating a secondary sound used for the superimposition. A signal $u(n)$ corresponds to the secondary sound used for the superimposition. The secondary sound when superimposed with the primary sound leads to a desired noise. The feedback signal $e(n)$ corresponds to the desired noise. The signal $u(n)$ corresponds (within the operating range) to the sound pressure of the secondary sound generated by a sound generator. The transfer function of the source Pz can be determined empirically.

The superimposition is symbolized in FIG. 3 by the summation sign $\Sigma$ and takes place in the acoustic area (e.g., in an exhaust gas line). The feedback signal $e(n)$ arising from the superimposition is detected, for example, by means of an error microphone, and returned to the control algorithm (ANC core) as a feedback signal.

$$e(n)=d(n)-u(n).$$

The feedback signal $e(n)$ thus corresponds to a sound pressure of the superimposed noise.

In FIG. 3, $P(z)$ is the Z-transform of the transfer function of the noise source. This transfer function $P(z)$ may depend, on the basic variable of the machine generating the noise (in this case a time-dependent input wave vector $x(n)$ representing the speed of rotation), and on numerous physical parameters, for example, pressure, mass flow rate and temperature of the sound-carrying system. The transfer function of the noise source $P(z)$ is not, as a rule, known exactly and is often determined empirically. For example, the engine can be operated at different values for different input parameters, the values of output parameters recorded, and input/output relationships determined.

It is known that the model of the ANC control shown in FIG. 3 has shortcomings, because the feedback signal $e(n)$ contains components that cannot be attributed to the transfer function $P(z)$ of the noise source. The feedback signal $e(n)$ is returned to the control algorithm and is obtained from the superimposition of the signal $d(n)$, which is generated by the noise source on the basis of the transfer function $P(z)$, with the sound generated by the sound generator corresponding to the signal $u(n)$.

The model of the ANC control is subsequently expanded by a second transfer function, or a sound system transfer function, of the sound generator $S(z)$, as is shown in FIGS. 4A and 4B.

This second transfer function $S(z)$ takes into account, on the one hand, shortcomings of the digital-analog (D/A) converters, filters, amplifiers, sound generators, etc., used in the electrical area, but also those of the path not yet taken into account in the acoustic area by the first transfer function $P(z)$ from the location of the sound generation/sound superimposition to the location of an error microphone determining feedback signal $e(n)$ and, finally, shortcomings of the error microphone, preamplifier, anti-aliasing filter and analog-digital (A/D) converter, etc., adjoining this in the electrical area.

In expanding the model from FIG. 3, the signal $y(n)$ generated by the ANC core in the model of FIGS. 4A and 4B therefore takes into account the second transfer function $S(z)$, which indicates the conversion of the signal $y(n)$ generated by the ANC core into the $u(n)$ signal. Here, $u(n)$ corresponds to the (mathematically idealized) amplitude of the secondary sound generated by the sound generator.

The second transfer function $S(z)$ takes into account the entire area from the output of the control $(y(n))$ to the feedback signal $(e(n))$ of the control.

When noises are generated by the noise source (i.e., the noise source is switched on), the second transfer function $S(z)$ is obtained as $$S(z)=u(z)/y(z)$$

and $u(n)$ corresponds to the convolution of the signals $s(n)$ and $y(n)$ $$u(n)=\mathrm{conv}[s(n),y(n)],$$

wherein $s(n)$ is the pulse response of the second transfer function $S(z)$. $e(z)$, $y(z)$ and $u(z)$ are the respective z-transforms of the signals $e(n)$, $y(n)$ and $u(n)$.

FIG. 4B shows the model from FIG. 4A in more detail. As can be seen, the signal $y(n)$ outputted by the ANC core is composed of two sinusoidal oscillations $\sin(\omega_0 n)$, $\cos(\omega_0 n)$, which are provided by a sine wave generator and are shifted by 90° relative to one another, and which were amplified before by different gain factors $w_1(n)$, $w_2(n)$ by means of two amplifiers in order to generate two signals $y_1(n)$, $y_2(n)$, which are shifted by 90° relative to one another with different amplitudes. The gain of the two amplifiers is correspondingly adapted dynamically by an adaptation circuit as a function of the feedback signal $e(n)$.

If, for example, the ith engine harmonic $EO_i$ shall be cancelled for a certain speed of rotation RPM of the internal combustion engine, the basic frequency $f_0$ to be canceled is obtained as $$f_0=EO_1 \cdot RPM/60.$$

$$\omega_0=2\pi f_0.$$

The adaptation circuit used to adapt the gain in FIG. 4B is operated with a clock frequency, which sets the clock frequency of the ANC core.

FIG. 5 schematically shows, the spectral frequency of, the amplitude (Magn) of the noise (noise(n)) over the frequency (Freq). Here, $d(n)$ indicates the current sound pressure or loudness at the given basic frequency $f_0$ in Pascal. $\|d(f)\|$ shows the value of the amplitude at a defined time for harmonics.

The input wave vector $x(n)$ of the ANC control is defined as follows (vectors are printed in bold):

$$x(n)=[\sin(\omega_0 n), \cos(\omega_0 n)].$$

The paper "Active Noise Control: A tutorial review" by Sen M. Kuo and Dennis R. Morgan, published in the Proceedings of the IEEE, Vol. 87, No. 6, June 1999 is incorporated in its entirety by reference. This paper demonstrates that the ANC control minimizes the feedback signal $e(n)$ after a build-up time. Reference is made to this paper in full extent and especially in respect to the narrowband feed forward control described there.

$$y(n)=x(n)w^T(n)=w(n)x^T(n)=w_1(n)\sin(w_0 n)+w_2(n)\cos(\omega_0 n).$$

Here, $x^T(n)$ designates the transpose of the input wave vector $x(n)$ and is obtained from a transposition of the columns and rows of the input wave vector $x(n)$.

The vector $w(n)=[w_1(n), w_2(n)]$ formed from the gain factors is called here the phasor vector of the ANC control.

As is shown in FIG. 4B, the gain of the sine waves is adapted by adaptation by means of the phasor vector w(n).

$$w(n+1)=w(n)+\mu \cdot conv[s(n),x(n)]e(n),$$

in which μ shows the rate of adaptation.

Since the transfer function S(z) is not known to the ANC core for each time. an estimate Ŝ(z) is used instead, so that the adaptation becomes $$w(n+1)=w(n)+\mu \cdot conv[\hat{s}(n),x(n)]e(n),$$

wherein ŝ(n) is the pulse response of Ŝ(z).

The estimate of the transfer function Ŝ(z) of the sound generator is formed in the known manner. A comparison is made between the signal output from the sound generator with the signal input to the sound generator. Any difference is caused by the manipulation performed to the signal by the sound generator. This manipulation is termed the transfer function of the sound generator S(z). However, the true transfer function is difficult to obtain for complex systems. Therefore, the invention allows for the use of an estimate of the transfer function which essentially compares the signal output from the sound generator (20) with the signal input to the sound generator for multiple operating conditions to form what is termed the estimate of the transfer function Ŝ(z) and could also be termed an optimal or best available transfer function. This includes among other things the effect of a digital-to-analog (D/A) converter, reconstruction filter, power amplifier, loudspeaker, acoustic path from loudspeaker to error microphone, error microphone, preamplifier, antialiasing filter, and analog-to-digital (A/D) converter.

It was demonstrated in the state of the art that under the assumption that
a) the signal d(n) to be superimposed is a simple wave; and
b) the actuator used can provide an amplitude $\|u(n)\| \geq \|d(n)\|$,
it is possible to markedly reduce the average (AVG) of e(n):

$$AVG[e(n)_{FINAL}] \sim 0.$$

It is emphasized that the above explanations are only examples, and the present invention also includes other known possibilities for generating the signal y(n) outputted by the ANC core.

It is disadvantageous in prior-art systems for actively influencing sound that attempts are made, as a rule, to extensively or fully cancel a noise generated by the noise source. This leads to an extensively high load on the actuator being used, and the sound pressure level arising will therefore have a very irregular curve.

SUMMARY OF THE INVENTION

Hence an object of the present invention is to provide a system and a method for actively influencing sound, which provides a greater degree of freedom in influencing sound. According to one embodiment, a system and a method for actively influencing sound are provided, which makes it possible to muffle or to amplify sound to be manipulated such that a predefinable sound pressure level or loudness becomes established.

Embodiments of a system for actively influencing sound have at least one sound generator each, an error sensor, a signal generator, a controller, an adder, and a weighter. The sound generator (which may have, for example, a loudspeaker) is configured here to generate sound when an audio signal is sent to it and to superimpose this to a sound to be manipulated. This sound generated by the sound generator is often also called "active noise control." The error sensor (which may be, for example, a microphone or a pressure sensor) is configured to measure sound, which is obtained from the superimposition of the sound generated by the sound generator to the sound to be manipulated, and to output a corresponding feedback signal. The signal generator (which may be, for example, an active noise control system known from the state of the art) is configured to generate a sound signal and to output it. The controller (which may be, for example, a programmable microprocessor) is configured to generate a first control signal and a second control signal. The adder is configured to subtract the second control signal from the feedback signal and to output the modified feedback signal obtained to the signal generator. The weighter is configured to weight the sound signal outputted by the signal generator with the first control signal generated by the controller and to output the sound signal thus weighted to generate the audio signal. The signal generator is configured here to generate the sound signal as a function of the modified feedback signal, and the controller is configured to generate the first and second control signals such that a value of the amplitudes of the feedback signal corresponds to a predefinable value.

The above configuration makes it possible to increase or muffle the sound to be manipulated by superimposition to a sound signal generated by the signal generator and amplified or reduced as a function of the first control signal such that the superimposed sound obtained will likewise have a sound pressure level that can be set via the predefinable value and is likewise extensively constant at a constant predefinable value. This makes it possible to comply with legal requirements. The predefinable value for a particular basic frequency may be lower or higher than or equal to the value of the amplitudes of the feedback signal with the system switched off.

According to one embodiment, the controller is configured to generate the first and second control signals with the use of a basic control signal. The basic control signal represents here a value of a sequence of rational numbers greater than or equal to zero. The basic control signal corresponds here to a quotient of the predefinable value with a value of the amplitude of the signal generated by the sound generator, if the value of the amplitudes of the signal generated by the sound generator is greater than a threshold value greater than zero. In the other case, when the value of the amplitudes of the signal generated by the sound generator is lower than or equal to the threshold value, the basic control signal corresponds to a predefined maximum. Such a basic control signal can be obtained in a simple manner. Since the first control signal used to amplify or muffle the sound signal generated by the signal generator and the second control signal used to manipulate the feedback signal are both obtained on the basis of the common basic control signal, a coordination between the first and second control signals is ensured in an especially simple manner. The above distinction is necessary when generating the basic control signal to prevent a division by zero. The threshold value may thus be any smaller positive number not equal to zero.

According to one embodiment, the controller is configured to generate the first control signal from the difference from one and from the basic control signal.

According to one embodiment, the controller is configured to generate the second control signal from the product of the basic control signal by a signal generated by the sound generator at an earlier time. The second control signal thus follows (with a short time delay) the sound generated by the sound generator with the sound to be manipulated. This time delay is necessary because the signals generated by the sound generator indirectly depend on the second control signal and would otherwise lead to an algebraic loop.

According to one embodiment, the earlier times of the signal generated by the sound generator against the basic control signal are earlier by one internal clock frequency or by a multiple of an internal clock frequency of the signal generator and thus as short as possible. Because of the short time lag, the error introduced during the generation of the second control signal is within narrow limits.

According to one embodiment, the signal generated by the sound generator takes into account a transfer function of the sound generator and is otherwise based on the weighted sound signal outputted by the weighter.

According to one embodiment, the controller is configured to determine the signal generated by the sound generator by convoluting the transmission function of the sound generator with the weighted sound signal outputted by the weighter. The determination of the signal generated by the sound generator is necessary for the calculation of the second control signal. Knowledge of the transfer function of the sound generator is also of interest for the generation of the sound signal by the signal generator.

According to one embodiment, the controller is configured to use an estimated transfer function, which is stored in the controller, instead of the transfer function of the sound generator in order to obtain an estimated value for the signal generated by the sound generator. Determining the transfer function of the sound generator for each possible operating state is very complicated. However, it is possible empirically to determine the transfer function of the sound generator for different operating states by experiments with different input values and recording the output values. Relationships between the input and output are determined and stored, for example, in a table or in the form of a function in the system. The estimated transfer function may also be predefined by the data input.

According to one embodiment, the signal generator is further configured to receive an input wave vector, which depends on the sound to be manipulated, and to generate the sound signal as a function of the input wave vector. The input wave vector //*x(n)*// is essentially a 1×N dimensional matrix of values (a single-column vector). Active noise cancellation has the problem that it may not be fast enough to cancel the exhaust sound by simply measuring the actual exhaust sound and generating a suitable anti-noise signal. As an example, the input wave vector (which is referred to as "reference input vector" in the essay "Active Noise Control: A tutorial review" of Sen M. Kuo and Dennis R. Morgan, published in Proceedings of the IEEE, Vol. 87, No. 6, June 1999), is a harmonic function of the rotational speed of an internal combustion engine."

The input wave vector may be representative of the speed of rotation or the engine load or the torque of an engine, which generates the primary sound to be manipulated. In addition or as an alternative, the input wave vector may be representative of an accelerator position or an accelerator gradient (change in the accelerator position per unit of time), the accelerator controlling an engine, which generates the sound to be manipulated. In addition or as an alternative, the input wave vector may be representative of a state of a clutch or a transmission, which are connected to an engine, which generates the sound to be manipulated. In addition or as an alternative, the input wave vector may be representative of a mode of operation of an engine, which generates the sound to be manipulated (e.g., "sport" or "economy"). In addition or as an alternative, the input wave vector may be representative of a voltage of a battery connected to an engine, which generates the sound to be manipulated (because the operating state of the engine can often be inferred from this voltage). In addition or as an alternative, the input wave vector may be representative of an operating state of an engine, which generates the primary sound to be manipulated (e.g., preparations are made for starting the engine/the ignition is turned on, the engine is started, the engine running).

According to one embodiment, the system may also have a microphone, which measures the sound to be manipulated and outputs a measured signal corresponding to this, wherein the signal generator is further configured to generate the sound signal by taking into account the measured signal, which is outputted by the microphone. As an alternative or in addition, the system may also have, according to one embodiment, a user interface, which is configured to receive a user input, wherein the signal generator is further configured to generate the sound signal by taking into account the user input, which is received via the user interface. As an alternative or in addition, the signal generator may be able to be connected, according to one embodiment, to an engine control of an engine and configured to generate the sound signal by taking into account signals that are received from the engine control.

According to one embodiment, the signal generator is configured to generate the sound signal with the use of a Filtered-x Least mean squares (FxLMS) algorithm.

According to one embodiment, the signal generator is configured to generate the sound signal separately for each harmonic of the sound to be manipulated (for each motor harmonic if the source of the sound to be manipulated is an internal combustion engine).

Embodiments of a motor vehicle have an internal combustion engine with an engine control and the above-described system. The engine control is connected to the signal generator and/or the controller and is configured to determine a speed of rotation and/or an engine load and/or a torque of the internal combustion engine and to output a corresponding input wave vector to the signal generator and/or to the controller.

Embodiments of a method for actively influencing sound have the following steps: Generation of a sound signal; Measurement of a superimposed sound, which is obtained from the superimposition of secondary sound generated as a function of the sound signal to a primary sound to be manipulated in order to obtain a corresponding feedback signal;
Generation of a basic control signal, wherein the basic control signal represents a value of a sequence of rational numbers greater than or equal to zero, wherein the basic control signal corresponds to a quotient of a predefinable value with a value of the amplitudes of a signal generated by a sound generator, if the value of the amplitudes of the signal generated by the sound generator is greater than a threshold value greater than zero, wherein the basic control signal corresponds to a predefinable maximum if the value of the amplitudes of the signal generated by the sound generator is smaller than or equal to the threshold value;
Generation of a first control signal from the difference from one and the basic control signal and of a second control signal from the product of the basic control signal with a signal which corresponds to a sound generated at an earlier time as a function of the sound generated from the sound signal;
Weighting of the sound signal with the first control signal in order to obtain a weighted signal; subtraction of the second control signal from the feedback signal in order to obtain a modified feedback signal, wherein the sound signal is generated in the step of generating the sound signal with the use of the modified feedback signal; and use of the weighted sound signal to generate the sound generated as a function of the sound signal.

It is noted in this connection that the terms "comprise," "have," "include," "contain" and "with" used in this description and in the claims to list features, as well as their grammatical variants should generally be considered to be an incomplete listing of features, e.g., method steps, devices, areas, variables and the like, and they do not in any way exclude the presence of other or additional features or groupings of other or additional features.

Further features of the present invention appear from the following description of exemplary embodiments in conjunction with the claims as well as with the figures. Identical or similar elements are designated by identical or similar reference numbers in the figures. It should be noted that the present invention is not limited to the embodiments of the exemplary embodiments described, but is determined by the scope of the attached patent claims. In particular, the individual features may be embodied in embodiments according to the present invention in a different number and combination than in the examples mentioned below.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
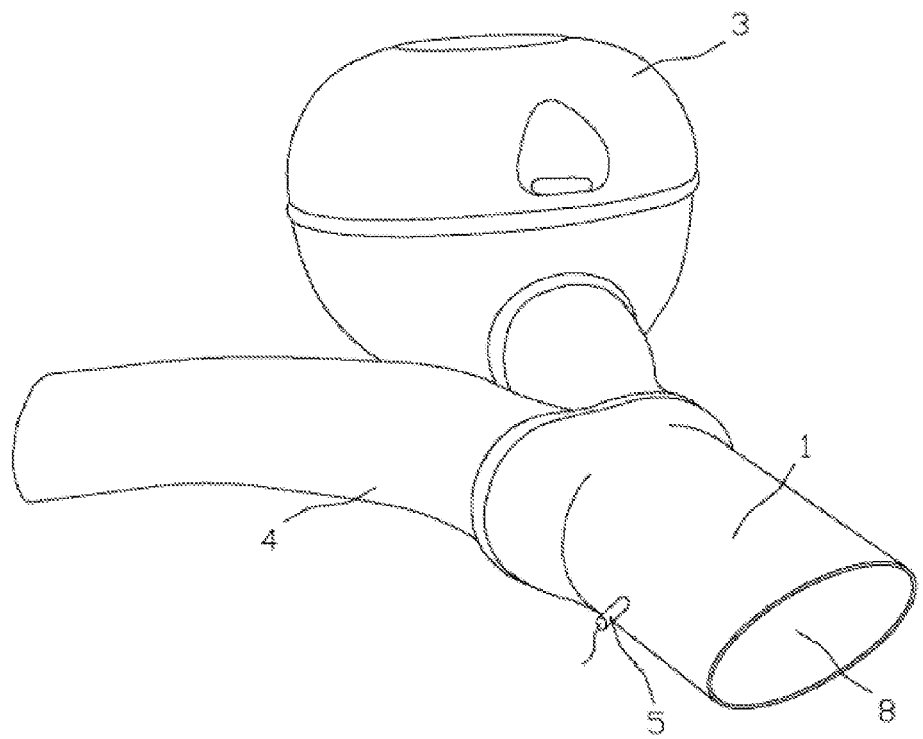
FIG. 1 is a perspective view of a system for actively influencing sound being carried in the exhaust system according to the state of the art.
Figure 2:
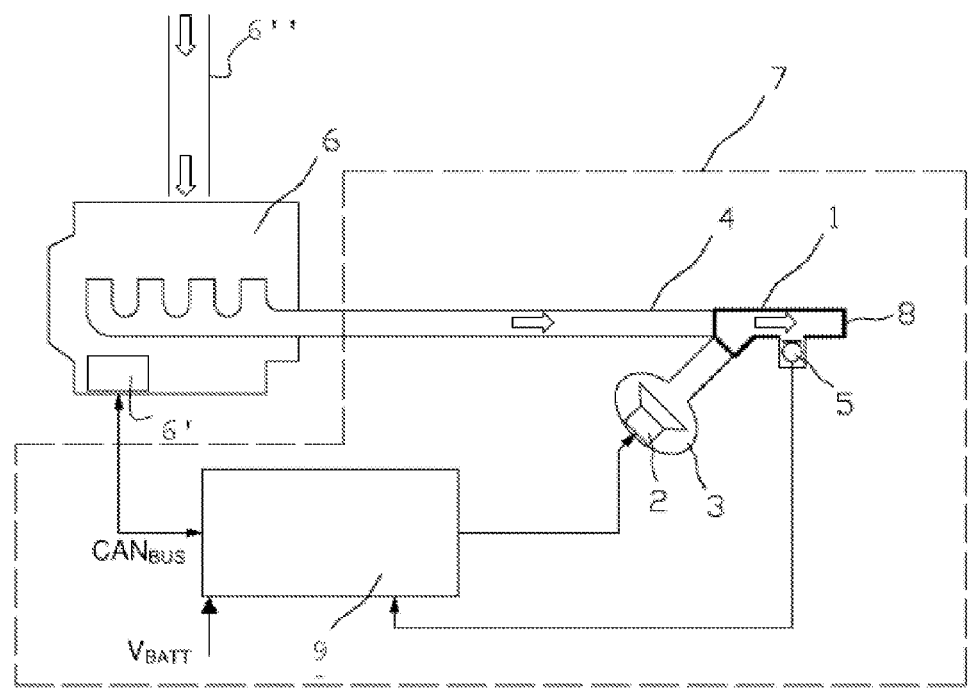
FIG. 2 is a schematic view showing a block diagram of the system for actively influencing sound being carried in the exhaust system according to FIG. 1.
Figure 3:
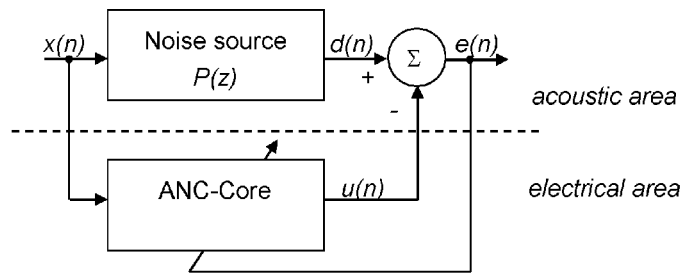
FIG. 3 is a schematic view showing a signal flow chart of a system for actively influencing sound according to the prior art.

Referring to the drawings, a preferred embodiment of the present invention will be explained below with reference to the figures.

Figure 7:
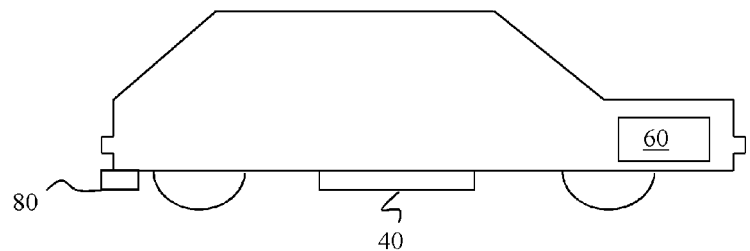
FIG. 7 is a schematic view showing a vehicle operated by means of an internal combustion engine with the system from FIG. 6.

A motor vehicle schematically shown in FIG. 7 has an engine in the form of an internal combustion engine 60 and an exhaust system 40, via which exhaust gases and sound generated in the internal combustion engine 60 during the operation are carried to a tail pipe 80. The exhaust gases are cleaned in the exhaust system 40 and the sound is muffled before the exhaust gases are released to the surrounding area via the tail pipe 80.

Figure 6:
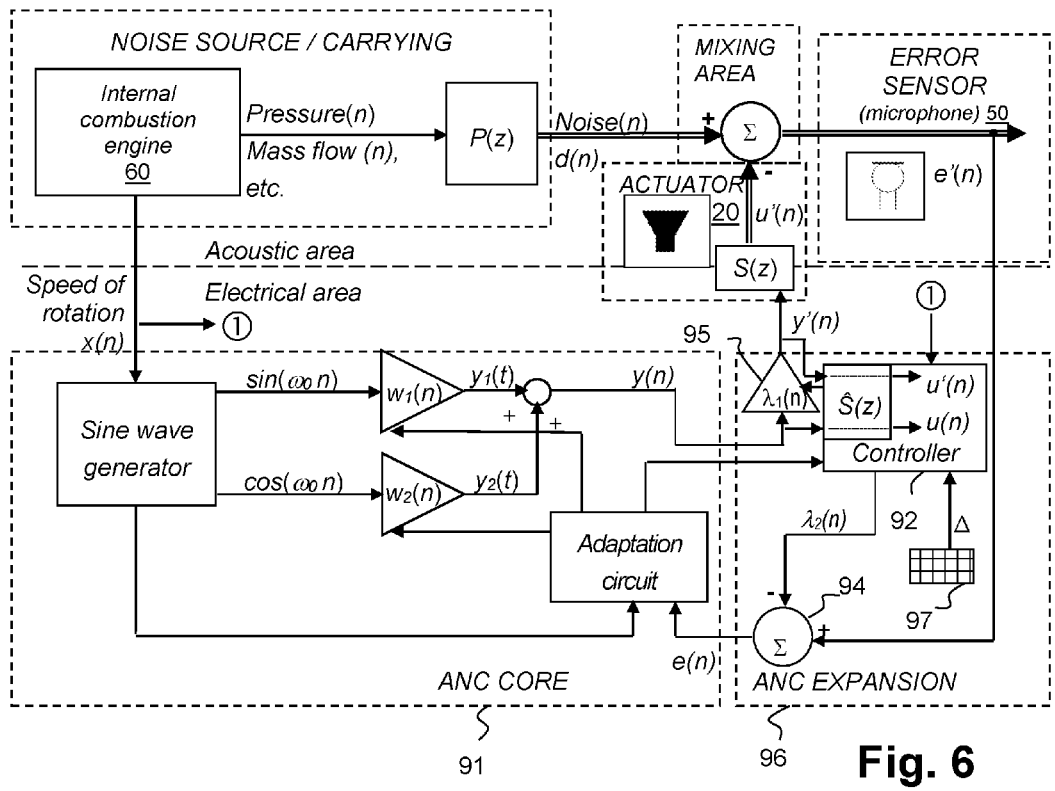
FIG. 6 is a schematic view showing a signal flow chart of a system for actively influencing sound according to one embodiment of the present invention.

In FIG. 6, which schematically shows a signal flow chart of a system for actively influencing sound according to one embodiment of the present invention, the noises/primary sound generated by the internal combustion engine 60 and carried in the exhaust system 40 to be superimposed, correspond to, or are represented by, a signal d(n). The dependence of n shall express the fact that the noises generated by the internal combustion engine 60 depend on the operating state of the internal combustion engine 60 (for example, the speed of rotation and/or the torque of the internal combustion engine 60) and are thus subject to change over time. However, the values of n are not continuous, but discrete.

A sound generator 20 (actuator) with loudspeaker is coupled with the exhaust system in the exhaust system via a mixing area having a Y line. The loudspeaker receives the sound signal y(n) and generates (taking into account the transfer function S(z) of the sound generator and components belonging to it) a sound, which corresponds to, or is represented by, a weighted signal u'(n) to be used for the superimposition, and is also superimposed to noises being carried in the exhaust system.

If the signals d(n), which correspond to the primary sound/noises being carried in the exhaust system, have a phase shift of 90° relative to the weighted signal u'(n) of the secondary sound generated by the loudspeaker, which signal is used for the superimposition, and the signals d(n) and u'(n) also correspond to one another in terms of amplitude (i.e., d(n)=−u'(n)), full cancellation of the noises being carried in the exhaust system will occur.

The sound thus emitted via the tail pipe 80 is measured via an error sensor 50, which is configured as an error microphone, and which is arranged downstream of the site of superimposition of the noises being carried in the exhaust system to the sound generated by the loudspeaker in relation to the flow direction of the noises being carried in the exhaust system.

The final sound signal y'(n), with which the loudspeaker is operated, is provided by an active noise control system, which comprises an ANC core 91 and an ANC expansion 96.

Figure 4A:
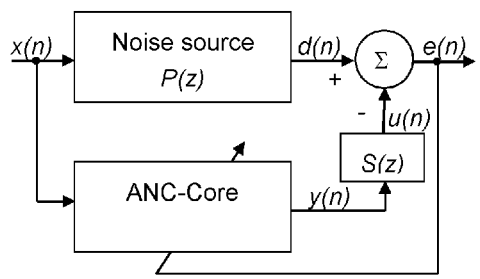
FIG. 4A is a schematic view showing a signal flow chart with a degree of detail for a system for actively influencing sound according to the state of the art.
Figure 4B:
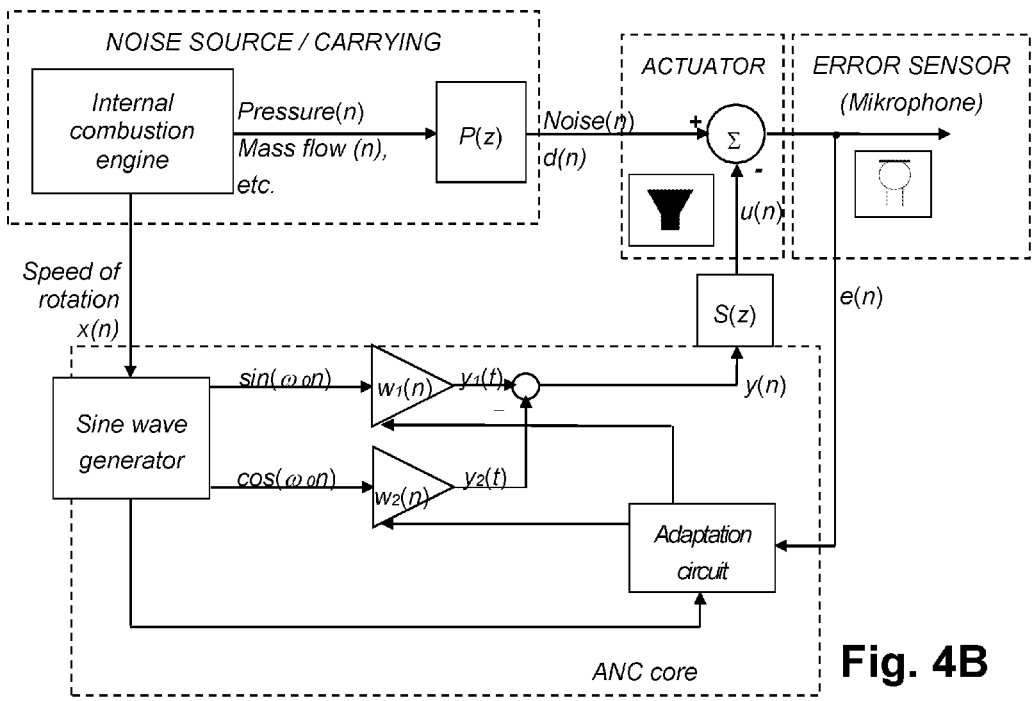
FIG. 4B is a schematic view showing a signal flow chart with another degree of detail for a system for actively influencing sound according to the state of the art.
Figure 5:
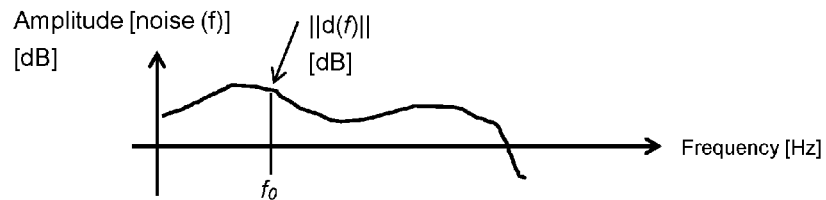
FIG. 5 is a schematic view showing the amplitude curve of a noise to be manipulated.

The ANC core 91 has a sine wave generator, first and second amplifiers and an adaptation circuit, and thus forms a signal generator. Reference is made to the explanations given for FIG. 4B.

The ANC expansion 96 has a controller 92, a weighter or amplifier 95 (which is formed here by an amplifier with adjustable gain), an input interface 97 (which is configured here as a human-machine interface in the form of a keyboard), and an adder 94.

In the embodiment shown in FIG. 6, the ANC core 91 and the ANC expansion 96 are embodied by separate microprocessors. As an alternative, both may, however, also be embodied by a single microprocessor.

The ANC core 91 and the ANC expansion 96 are connected to an engine control unit (not shown) of the internal combustion engine 60 and receive from the engine control a control signal in the form of an input wave vector x(n), which indicates a current speed of rotation and a current torque of the internal combustion engine 60.

The input wave vector x(n) can be essentially a multi-dimensional table (a matrix of values). Active noise cancellation has the problem that it may not be fast enough to cancel the exhaust sound by simply measuring the actual exhaust sound and generating a suitable anti-noise signal. As such the input wave vector x(n) comprises multiple values that may be input to the controller 92 for forming the control signal λ(n). The input wave vector x(n), including plural values, is formed by measuring the system (including the internal combustion engine 60, exhaust duct/exhaust system 40, etc.) at various operating conditions (temperatures, torques, rpm . . . ). Based on the measurements the input wave vector x(n) is formed. The input wave vector x(n) may be dynamic, e.g. the vector is changed in dependency on an additional microphone or a user input 97 (for sport mode-silent mode). The input wave vector x(n) is representative of at least one parameter of an engine, in particular namely, the speed of rotation or engine load, which represents the noise source; the position of the accelerator or a gradient of the accelerator (change in the position of the accelerator per unit of time), the accelerator controlling the noise source; a state of a clutch or of a transmission, which are connected to the noise source; a mode of operation of the noise source (e.g., "sport" or "economy" in case of an internal combustion engine of a vehicle); a voltage of a battery connected to the noise source; and an operating state of the noise source (e.g., preparations are made for starting the noise source (in case of an internal combustion engine: Ignition is turned on, noise source is started, noise source is running)).

Further, the controller 92 of the expansion 96 receives via the input interface 97 an input of the user. The user input is a value Δ predefined, and that is desired, for the value of the amplitudes of the feedback signal, and thus is a value (e.g. decibels) of the desired sound pressure or loudness of the sound coming out of the tail pipe. This predefined value Δ does not, however, have to be constant, but may change over time.

It is emphasized that the present invention is not limited to the use of a keyboard as an input interface 97. It is also possible, for example, as an alternative, to store suitable predefined values Δ for the value of the amplitudes of the feedback signal in the form of a table in the ANC expansion 96 and to read them when needed. The predefined values Δ may also have a dependence on the input wave vector x(n).

Based on the received speed of rotation and the torque, the ANC core 91 generates in the known manner (here with the use of an FxLMS algorithm) an initial sound signal y(n), which would be suitable for cancelling the signal d(n) representing the primary sound to be superimposed. This primary sound being carried in the exhaust system would be cancelled if the loudspeaker were operated with initial sound signal y(n). The ANC core 91 takes into account the transfer function S(z) of the sound generator 20.

The controller 92 further generates a first control signal $\lambda_1(n)$ and a second control signal $\lambda_2(n)$ as a function of the received speed of rotation, the received torque and the values Δ received via the input interface 97 for the value of the amplitudes of the feedback signal. The receiving of the speed of rotation, the torque, and other values is shown by reference 1 in FIG. 6.

Basic control signals λ(n) are determined in this embodiment in the controller 92 for a particular speed of rotation and torque of the motor vehicle. The basic control signals λ(n) are always rational numbers greater than or equal to zero. Therefore, a sequence of basic control signals λ(n), which represent a sequence of rational numbers greater than or equal to zero, is determined by the controller 92 over time.

To determine the basic control signal λ(n), it is first checked whether the value of the amplitudes of the signal (||u(n−1)||) corresponding to the sound generated by the sound generator 20 at an earlier time for the purpose of superimposition is greater than a threshold value $\varepsilon_1$ stored in the controller 92 in advance. The threshold value $\varepsilon_1$ stored in advance, equaling 0.0001, is very small in the embodiment being shown. If this is the case, the basic control signal λ(n) is determined as a quotient of the predefinable value Δ to the value of the amplitudes of the signal ||u(n−1)|| generated by the sound generator 20 at an earlier time for the purpose of superimposition. Otherwise, if the value of the amplitudes of the signal ||u(n−1)|| generated by the sound generator 20 at an earlier time for the purpose of superimposition is lower than or equal to the threshold value $\varepsilon_1$, the basic control signal λ(n) is set at a predefined maximum $\Lambda_{MAX}$, which equals the value "60" in this case.

It is emphasized that the present invention is not limited to a concrete threshold value $\varepsilon_1$. It is sufficient if the threshold value $\varepsilon_1$ is greater than zero. The present invention is also not limited to a maximum $\Lambda_{MAX}$ of "60." The maximum $\Lambda_{MAX}$ rather depends on the components used in the system.

In the embodiment shown, the preceding times (n−1) of the signal u(n−1) representing the secondary sound generated by the sound generator precede the present time by 10 times each of an internal clock frequency of the signal generator. However, the present invention is not limited to this; however, the earlier times should be as close to the present as possible in order to keep an error low.

Different approaches to determining the amplitudes of the signal ||u(n−1)|| representing the sound generated by the sound generator 20 at an earlier time will be explained later.

The first control signal $\lambda_1(n)$ is then determined by the controller 92 as a difference from one and from the basic control signal λ(n), ($\lambda_1(n)=1\times\lambda(n)$).

The second control signal $\lambda_2(n)$ is then determined by the controller 92 as a product of the basic control signal λ(n) and the signal u(n−1) representing the sound generated by the sound generator 20 at an earlier time for the purpose of superimposition.

The ANC core 91 outputs the initial sound signal y(n), and the controller 92 of the ANC expansion 96 outputs the first control signal $\lambda_1(n)$ to the weighter/amplifier 95.

The weighter/amplifier 95 weights/amplifies the initial sound signal y(n) with the first control signal $\lambda_1(n)$ and to generate the weighted/final sound signal y'(n) thus weighted to the loudspeaker of the sound generator 20. The loudspeaker is thus operated with the weighted/final sound signal y'(n) to generate the second sound. Taking into account the transfer function S(z) of the sound generator 20, the secondary sound, which is represented by a weighted signal u'(n), is superimposed to the primary sound being carried in the exhaust system, which primary sound is represented by the signal d(n).

Since the initial sound signal y(n) originally generated by the ANC core 91 was weighted before with the first control signal $\lambda_1(n)$, the weighted final sound signal y'(n) is not usually able any longer to fully cancel the sound being carried in the exhaust system 40 if the loudspeaker is operated with the final sound signal y'(n). The sound being carried in the exhaust system is rather canceled, as a rule, to a certain extent only, or even amplified, and this depends on the predefined values $\Delta$, which are used when determining the control signal $\lambda(n)$.

The second control signal $\lambda_2(n)$ is subtracted by the adder 94 from the feedback signal e'(n), which is received from the error sensor 50, in order to obtain a modified feedback signal e(n).

The ANC core 91 receives the modified feedback signal e(n) and takes it into account in the known manner when generating the initial signal y(n), which is suitable for cancelling the primary sound d(n) being carried in the exhaust system 40 when the loudspeaker is operated with the initial sound signal y(n).

The algorithm implemented in the ANC core 91 and in the ANC expansion is based on the following considerations (which are taken separately for each engine harmonic of the internal combustion engine 60):

The sound to be cancelled, which is represented by d(n) and is carried in the exhaust system 40, can be represented as a basically harmonic signal with phase and amplitude that are variable over time for a defined engine harmonic and speed of rotation and hence for a defined input wave vector x(n) (and hence for a frequency $f_0$)

$$d(n)=D(n)\sin(\omega_0 n+\varphi_d(n))\ \omega_0=2\pi f_0,$$

wherein "n" shows the time curve (is a time index of a time-discrete series). $\varphi_d(n)$ is called "system phase" and only depends on the noise source.

The sound to be emitted by the loudspeaker must correspondingly likewise correspond to a harmonic signal u(n) with a phase and amplitude variable over time:

$$u(n)=U(n)\sin(\omega_0 n+\varphi_u(n)).$$

Here, D(n) and $\varphi_d(n)$ are not known at first. As soon as the ANC control converges, the following approximation is, however, permissible:

$$(\varphi_u)=(\varphi_d)\ (u(n)\ \text{and}\ d(n)\ \text{are in phase}).$$

Therefore, u(n) can be rewritten as:

$$u(n)=U(n)\sin(\omega_0 n+\varphi_d(n)).$$

The residual sound e(n) at the tail pipe 80 is obtained for the frequency $f_0$ after superimposition of the signal d(n) corresponding to the sound being carried in the exhaust system 40 to the signal u(n) corresponding to the sound emitted by the loudspeaker as follows:

$$e(n)=d(n)-u(n).$$

Consequently, e(n) is likewise a linear combination of harmonic signals and can therefore likewise be expressed as a function of the "system phase" $\varphi_d(n)$:

$$e(n)=E(n)\sin(\omega_0 n+\varphi_d(n)).$$

The amplitude E(n) shall now be controlled with the system and method according to the present invention.

In case of successful sound cancellation, e(n) converges after a certain time for a particular basic frequency $f_0$ towards zero, so that $$e(n)=d(n)-u(n)\Rightarrow 0\approx d(n)-u(n)$$

is true in case of successful sound cancellation.
This formula can be rewritten as:

$$d(n)-\lambda u(n)+\lambda u(n)-u(n)\approx 0$$

and further as $$d(n)-(1-\lambda)u(n)-\lambda u(n)\approx 0.$$

Here, $\lambda$ is a real number.

The following new variables e'(n), u'(n) and y'(n), which are also used in FIG. 6, are introduced:

$$e'(n)=d(n)-(1-\lambda)u(n)\Rightarrow e(n)=e'(n)-\lambda u(n)$$

$$u'(n)=(1-\lambda)u(n)=(1-\lambda)\text{conv}[s(n),y(n)]=\text{conv}[s(n),(1-\lambda)y(n)]$$

(wherein cony designates the convolution of two time series)

$$y'(n)=(1-\lambda)y(n).$$

The difference between u(n) and u'(n) is as follows:
u(n) is the output of the transfer function S(z) (i.e. the sound pressure of a sound generator) if y(n) is the input; and u'(n) is the output of the transfer function S(z) (i.e. the sound pressure of a sound generator) if y(n) attenuated by $\lambda 1(n)$ (reference sign 95) is the input.
Both are depending on y(n) which is known to the ANC-Core.

For the generation of the second control signal $\lambda 2(n)$ it is not necessary to attenuate y(n) by $\lambda 1(n)$. In FIG. 6, u(n) is calculated by the controller based on y(n) and the transfer function S(z) (or the estimated transfer function S(z), if the real transfer function is unknown).

As was mentioned above, no full sound cancellation shall be sought to be achieved by means of the system and the method according to the present invention, but a value of the amplitudes of the feedback signal corresponds to a predefined value $\Delta$. This value may be lower or higher than or equal to the value that would be obtained for the amplitudes of the feedback signal with the system switched off. The desired signal after the superimposition (FINAL) is therefore obtained as $$e'(n)_{FINAL}=\lambda u(n).$$

This value shall correspond according to the present invention to the predefined value $\Delta$:

$$//e'(n)_{FINAL}//=\Delta \Rightarrow \lambda//u(n)//=\Delta,$$

in which $\Delta$ is the predefinable value and hence the desired sound pressure level.

Since u(n) is not constant but is a time-variant signal over n, $\lambda$ must be time-variant as well.

$$\lambda(n) = \frac{\Delta}{\|u(n)\|}.$$

This formula cannot be used directly in the ANC expansion, because the problem of an algebraic loop is present: u(n) depends on λ(n), and λ(n) depends on u(n). This problem can be circumvented by using values of u(n) that are slightly earlier values in time (these chronologically preceding values are called "n−1"). The time lag should be selected to be as small as possible; thus, $$\|u(n)\| \approx \|u(n-1)\|.$$

Further, a division by the value "zero" must be avoided.

In this case, $\|u(n)\|$ and $\|u(n-1)\|$ shall be calculated by the controller 92. As was already explained in the explanation of FIGS. 4A and 4B, u(n) corresponds to the convolution of the signals s(n) and y(n)

$$u(n) = \mathrm{conv}[s(n), y(n)],$$

wherein s(n) is the pulse response of the transfer function S(z) of the sound generator 20 and of the components connected thereto. Usually s(n) is not known. However, it is possible to empirically determine and thus estimate the transfer function Ŝ(z) of the components used for the sound generation and the pulse response ŝ(n). Controller 92 has an estimate Ŝ(z) of the second transfer function S(z) of the sound generator 20.

$$\tilde{u}(n) = \mathrm{conv}[\hat{s}(n), y(n)] \approx u(n).$$

The following estimation is thus permissible:

$$\|u(n)\| \approx \|u(n-1)\| \approx \|\tilde{u}(n-1)\|.$$

Here, ũ(n) estimates the signal that represents the sound outputted by the sound generator 20.

If the convolution operator conv[.] is applied to a harmonic signal, this signal can be represented simply by the phase delay $TF_{PHASE}$ and the muffling $TF_{AMP}$ at the given basic frequency $f_0$:

Muffling: $\|\hat{S}(z)\| = TF_{AMP}$ at the given basic frequency $f_0$

Phase delay: $\mathrm{Arg}\{\hat{S}(z)\} = TF_{PHASE}$ at the given basic frequency $f_0$ $$\tilde{u}(n) = TF_{AMP}\{w_1(n)\sin(\omega_0 n - TF_{PHASE}) + w_2(n)\cos(\omega_0 n - TF_{PHASE})\}$$

$$\tilde{u}(n) = \tilde{U}(n)\sin(\omega_0 n + \varphi_u(n)).$$

The signal being sought can thus be calculated with the following pseudocode:

```
function Estimate_Actuator ( )
{
ũ (n−1) = TF_AMP{w_1(n) sin(ω_0 n − TF_PHASE) +
w_2(n) cos(ω_1 n − TF_PHASE)}
}
```

The modified feedback signal e(n) is then obtained as $$e(n) = e'(n) - \lambda(n)\tilde{u}(n-1) = e'(n) - \lambda_2(n)$$

and the weighted signal y'(n) as $$y'(n) = [1 - \lambda(n)]y(n) = \lambda_1(n)y(n).$$

The following pseudocode can be used to calculate the first and second control signals $\lambda_1(n)$, $\lambda_2(n)$:

```
If (‖ũ (n − 1)‖ > ε_1)
{
    λ(n) = Δ / ‖ũ(n − 1)‖
}
Else
{
    λ(n) = Λ_max
}
λ_1(n) = 1 − λ(n)
λ_2(n) = λ(n) * ũ(n − 1)
ũ(n − 1) = Estimate_Actuator ( )
‖ũ(n − 1)‖ = Estimate_ActuatorWaveAmplitude ( )
```

Here, ũ(n−1) and $\|\tilde{u}(n-1)\|$ are each initialized with "0," and updated after each calculation of $\lambda_1(n)$ and $\lambda_2(n)$, so that no algebraic loop develops. The values $\Lambda_{MAX}$ and $\varepsilon_1$ are constants, which depend on the microprocessors (or digital signal processors) used in the ANC core and in the ANC expansion, on the performance capacity of the sound generator and the like and can be determined empirically.

The value of the amplitude $\|\tilde{u}(n-1)\|$ changes continuously and should therefore be updated with each clock frequency of the system.

The following four methods are proposed for calculating $\|\tilde{u}(n-1)\|$:

1) Length Method ("Magnitude Method")

ũ(n) can be considered to be the sum of two orthogonal vectors; consequently, the value can be calculated with the following pseudocode through the length

```
function Estimate_ActuatorWaveAmplitude ( ) /*Magnitude method*/
{
‖ũ(n−1)‖ = SQRT[w_1(n)^2 + w_2(n)^2] * TF_AMP (ω_0)
}
``` wherein SQRT is the square root. This can be stored as a characteristic diagram in the controller 92, so that this method can be highly efficient in respect to the computing power.

2) Analytical Method

ũ(n) can be represented as follows:

$$\tilde{u}(n) = TF_{AMP}\{w_1(n)[\sin(\omega_0 n)\cos(TF_{PHASE}) + \cos(\omega_0 n)\sin(TF_{PHASE})] + w_2(n)[\cos(\omega_0 n)\cos(TF_{PHASE}) - \sin(\omega_0 n)\sin(TF_{PHASE})]\}$$

When defining in this case $$\sin(\tau) = \sin(\omega_0 n)\cos(TF_{PHASE}) + \cos(\omega_0 n)\sin(TF_{PHASE})$$

$$\cos(\tau) = \cos(\omega_0 n)\cos(TF_{PHASE}) - \sin(\omega_0 n)\sin(TF_{PHASE})$$

$$k_1(n) = TF_{AMP}(\omega_0)w_1(n)$$

$$k_2(n) = TF_{AMP}(\omega_0)w_2(n),$$

a simpler expression can be obtained for ũ(n):

$$\tilde{u}(n) = k_1(n)\sin(\tau) + k_2(n)\cos(\tau).$$

The amplitude is the local maximum $MAX_{LOCAL}$ of the above harmonic function, and the points at which the first derivation of ũ(n) is equal to zero (because the signals are sinusoidal oscillations, $\mathrm{abs}(MIN_{LOCAL}) = MAX_{LOCAL}$) are sought. The function "abs(.)" now yields the absolute value.

$$\frac{d}{d\tau}\tilde{u}(n) = -k_1(n)\cos(\tau) + k_2(n)\sin(\tau) = 0$$

-continued $$\tau_0 = \tan^{-1}\left(\frac{k_1(n)}{k_2(n)}\right)$$

$$= \tan^{-1}\left(\frac{TF_{AMP}(\omega_0)w_1(n)}{TF_{AMP}(\omega_0)w_2(n)}\right)$$

$$= \tan^{-1}\left(\frac{w_1(n)}{w_2(n)}\right)$$

$$\|\tilde{u}(n)\| = MAX_{LOCAL}$$
$$= abs[k_1(n)\sin(\tau) + k_2(n)\cos(\tau)]$$
$$= abs[TF_{AMP}(\omega_0)w_1(n)\sin(\tau) + TF_{AMP}(\omega_0)w_2(n)\cos(\tau)]$$
$$= TF_{AMP}(\omega_0) * abs[w_1(n)\sin(\tau) + w_2(n)\cos(\tau)]$$

Thus, $\|\tilde{u}(n)\|$ can be calculated with the following pseudo-code:

```
function Estimate_ActuatorWaveAmplitude( ) /*Analytical method*/
{
If abs (w₂ (n) > ε₀)
    {
        τ₀ = arctg [w₁ (n) / w₂ (n)];
        ||ũ(n−1)|| = TF_AMP(ω₀) * abs[ w₁(n) sin(τ₀) + w₂ (n) cos(τ₀)];
    }
    else
    {
        ||ũ(n−1)|| = TF_AMP(ω₀) w₁(n)
    }
}
```

Here, arctg is the arc tangent function (arctan). $\varepsilon_0$ is a low value, which depends on the solution of the algorithm and the microprocessors (or digital signal processors) used and typically equals 0.001. The arc tangent function may be stored as a characteristic diagram in the controller 92, so that this method may be very efficient in respect to the computing power. Further, the singularities of the arc tangent function are treated correctly if $w_2(n)=0$.

The above two methods make possible the exact calculation of $\|\tilde{u}(n-1)\|$.

Since the amplitude of the signal corresponding to the noise d(n) changes very slowly compared to the frequency, it is possible to update $\|\tilde{u}(n-1)\|$ more slowly than the clock frequency (e.g., at a ratio of 1:2 to 1:20), so that the necessary computing power is reduced.

3) Under-Sampled Analytical Method
It follows from $$\tilde{u}(n-1) = TF_{AMP}\{w_1(n)\sin(\omega_0 n - TF_{PHASE}) + w_2(n)\cos(\omega_0 n - TF_{PHASE})\}$$

that $\tilde{u}(n)$ can be considered to be a linear function of the phasor vector w(n). If the phasor vector w(n) is parallel to the X axis or the Y axis, the value of the amplitude $\|\tilde{u}(n-1)\|$ is simply a part of one component or another of the phasor $w_1(n)$ or $w_2(n)$. $\|\tilde{u}(n-1)\|$ is updated twice or four times for each period $1/f_0$ in this method. As was already mentioned, it is not necessary to update $\|\tilde{u}(n-1)\|$ with each clock frequency.

$\|\tilde{u}(n-1)\|$ can thus be calculated with the following pseudo-code:

```
function Estimate_ActuatorWaveAmplitude( ) /*Under-sampled
analytical method, 4 times update*/
{
    if [abs (w₂ (n) ) <= ε₀]
    {
        ||ũ (n−1)|| = TF_AMP(ω₀) w₁(n) ;
    }
```

```
    }
    else
    if [abs (w₁ (n) ) <= ε₀]
    {
        ||ũ (n−1)|| = TF_AMP(ω₀) w₂(n) ;
    }
}
or
function Estimate_ActuatorWaveAmplitude( ) /*Under-sampled
analytical method, 2 times update*/
{
    if [abs (w₂(n) ) <= ε₀]
    {
        ||ũ (n−1)|| = TF_AMP(ω₀) w₁(n) ;
    }
}
```

Here, $\varepsilon_0$ is a low value, which depends on the solution of the algorithm and the microprocessors (or digital signal processors) used, and typically equals 0.01. This type of calculation is very efficient.

4) Compare Method

For wave-shaped signals, there also is a less optimal method, which can be described by the following pseudocode:

```
function Estimate_ActuatorWaveAmplitude( ) /*Compare method*/
{
    ũ_ABS (n) = abs(ũ (n));
    If (ũ_ABS(n−1) >= ũ_ABS(n−2)) and (ũ_ABS(n−1) >= ũ_ABS(n))
    {
        ||ũ (n−1)|| = ũ_ABS (n−1);
    }
    ũ_ABS(n−2) = ũ_ABS(n−1);
    ũ_ABS(n−1) = ũ_ABS(n);
}
```

It is advantageous in this method that no square root or arc tangent function is needed. However, $\|\tilde{u}(n-1)\|$ is also updated only twice in each wave period.

Figure 8:
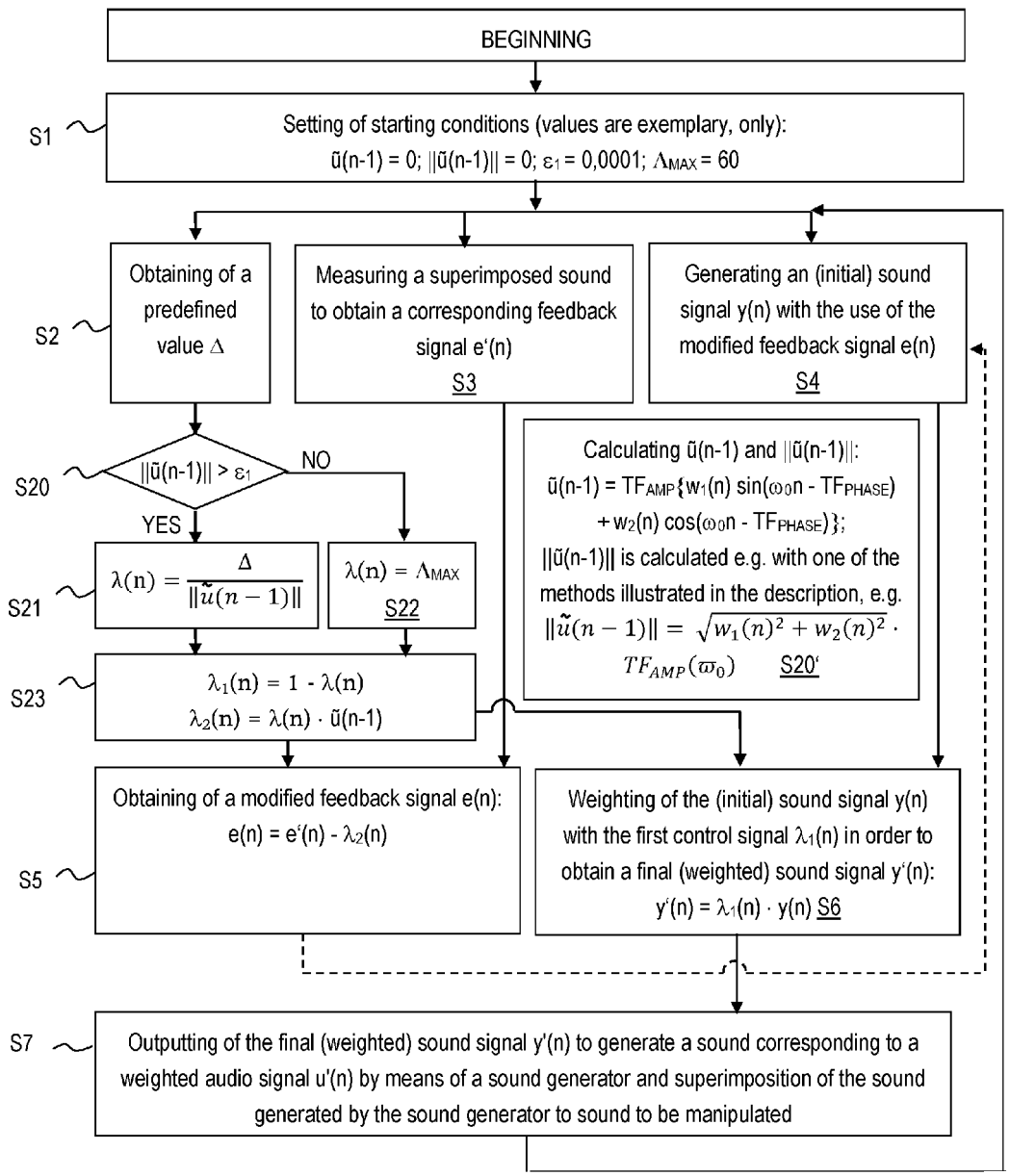
FIG. 8 is a flow chart of a method for actively influencing sound being carried in the exhaust system according to the present invention.

A method for operating the above-described system will be described below with reference to FIG. 8.

In a first step S1, start values for variables and constants used are set in the controller 92 of the ANC expansion 96: $\tilde{u}(n-1)=0$, $\|\tilde{u}(n-1)\|=0$; $\varepsilon_1=0.0001$; $\Lambda_{MAX}=60$.

A predefined value $\Delta$ is subsequently obtained in step S2 via the input interface 97 in the controller 92. The predefined value $\Delta$ is preferably the desired sound pressure of the sound emitted from the tailpipe.

Superimposed sound is measured simultaneously with this in step S3 by means of the error sensor 50 in order to obtain a corresponding feedback signal e'(n).

Further, an initial sound signal y(n) is generated simultaneously with this in step S4 by the ANC core 91 with the use of the manipulated feedback signal e(n).

It is determined in step S20 following step S2 whether the condition $\|\tilde{u}(n-1)\|>\varepsilon_1$ is met. The values for $\tilde{u}(n-1)$ and $\|\tilde{u}(n-1)\|$ are calculated for this in step S20'. This was explained in detail above and may take place, for example, with the use of the following formulas:

$$\tilde{u}(n-1) = TF_{AMP}\{w_1(n)\sin(\omega_0 n - TF_{PHASE}) + w_2(n)\cos(\omega_0 n - TF_{PHASE})\}$$

$$\|\tilde{u}(n-1)\| = \sqrt{w_1(n)^2 + w_2(n)^2} \cdot TF_{AMP}(\omega_0)$$

It is emphasized that the calculation of the values for $\tilde{u}(n-1)$ and $\|\tilde{u}(n-1)\|$ taking place in step S20' can be carried out according to each of the above-described methods or according to the methods known from the prior art.

If the condition is met in step S20, the basic control signal λ(n) is calculated in step S21 as $$\lambda(n) = \frac{\Delta}{\|\tilde{u}(n-1)\|}.$$

Otherwise, if the condition of step S20 is not met, the basic control signal λ(n) is set at the maximum $\Lambda_{MAX}$ in step S22.

The first and second control signals $\lambda_1(n)$, $\lambda_2(n)$ are subsequently calculated in step S23 as follows:

$$\lambda_1(n)=1-\lambda(n)$$

$$\lambda_2(n)=\lambda(n)\cdot\tilde{u}(n-1).$$

A modified feedback signal e(n) is calculated in the next step S5 according to the following formula with the use of the second control signal $\lambda_2(n)$ obtained in step S23 and of the feedback signal e'(n) measured in step S3:

$$e(n)=e'(n)-\lambda_2(n).$$

The modified feedback signal e(n) is used in step S4, which is indicated by the broken line.

Simultaneously with this, a weighted final sound signal y'(n) is calculated in step S6 according to the following formula with the use of the first control signal $\lambda_1(n)$ obtained in step S23 and of the initial sound signal y(n) generated in step S4:

$$y'(n)=\lambda_1(n)\cdot y(n).$$

The weighted final sound signal y'(n) is outputted in step S7 to generate a sound corresponding to a weighted audio signal u'(n) by means of the sound generator 20 and to superimpose the sound generated by the sound generator 20 to sound to be manipulated before the method continues at the end of step S1.

The effect exerted by the system and method according to the present invention is shown in FIGS. 9A through 12C. The exhaust system of a vehicle operated by means of an internal combustion engine was correspondingly modified and complemented with the system according to the present invention.

Figure 9A:
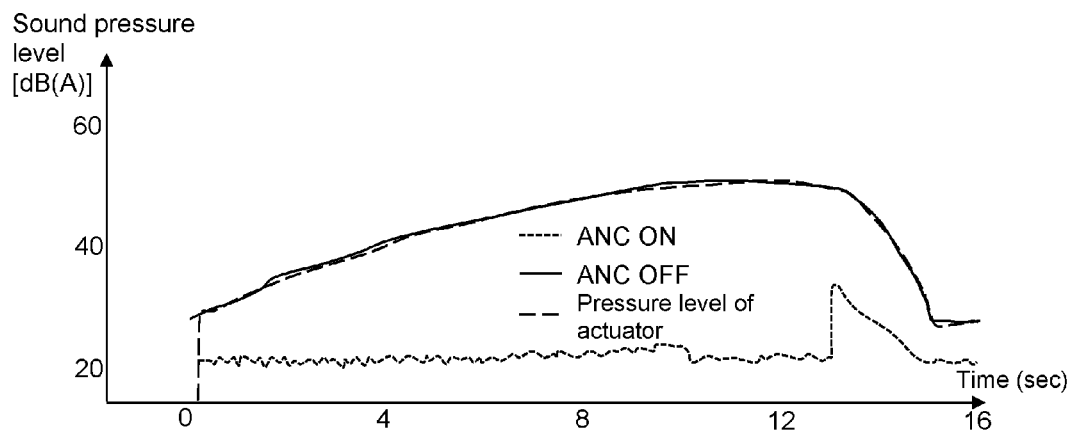
FIG. 9A is a schematic view showing the time curve of a sound pressure level with the use of the system from the state of the art according to FIGS. 4A, 4B.
Figure 9B:
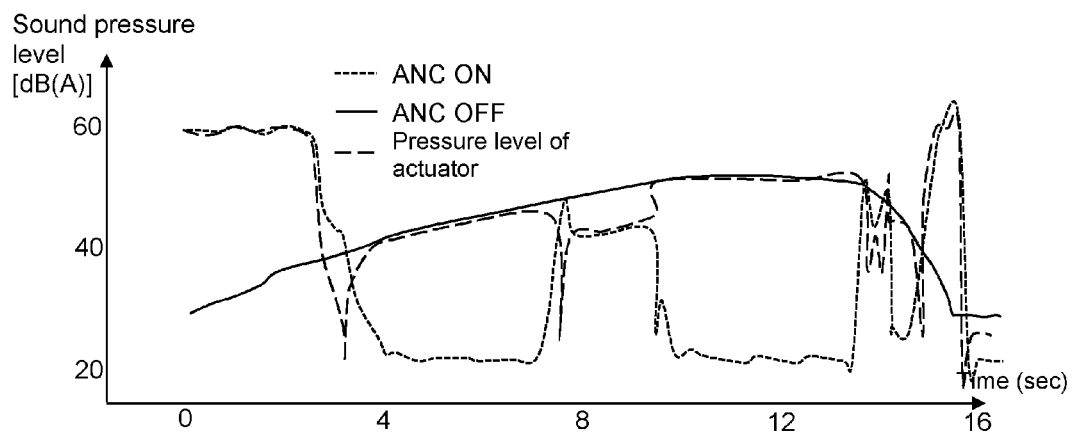
FIG. 9B is a schematic view showing the time curve of a sound pressure level with the use of the system from FIG. 6 with the use of external data input.

As is seen in FIG. 9A, conventional systems (ANC ON) seek to continuously reduce the sound pressure level to a lowest possible value (here about 20 dB) compared to the unmanipulated sound (ANC OFF). This happens as long as the dynamics and performance capacity of the system being used permit it. A transient (nonstationary build-up state), which can be attributed to the fact that the dynamics of the system being used is not sufficient, can be recognized between the 13$^{th}$ and 15$^{th}$ seconds. The pressure level appearing at the actuator (sound generator) is additionally shown.

Compared to this, it is possible by means of the system according to the present invention to raise the sound pressure level compared to the unmanipulated sound (ANC OFF) to any desired predefinable value Δ (e.g. FIG. 9B, until about 3.5 sec and about 60 dB between 15 and 16 sec) or to reduce it (about 20 dB beginning from about 4 sec to about 7 sec, about 40 dB from about 8 sec to about 9 sec, and about 20 dB from about 9.5 sec to about 13.5 sec). The control has a short build-up characteristic with any change in the predefinable value Δ and transient will therefore appear in the signal pattern. It should be noted that an extreme data input was selected for this example (the predefinable value Δ has sharp jumps).

Figure 10:
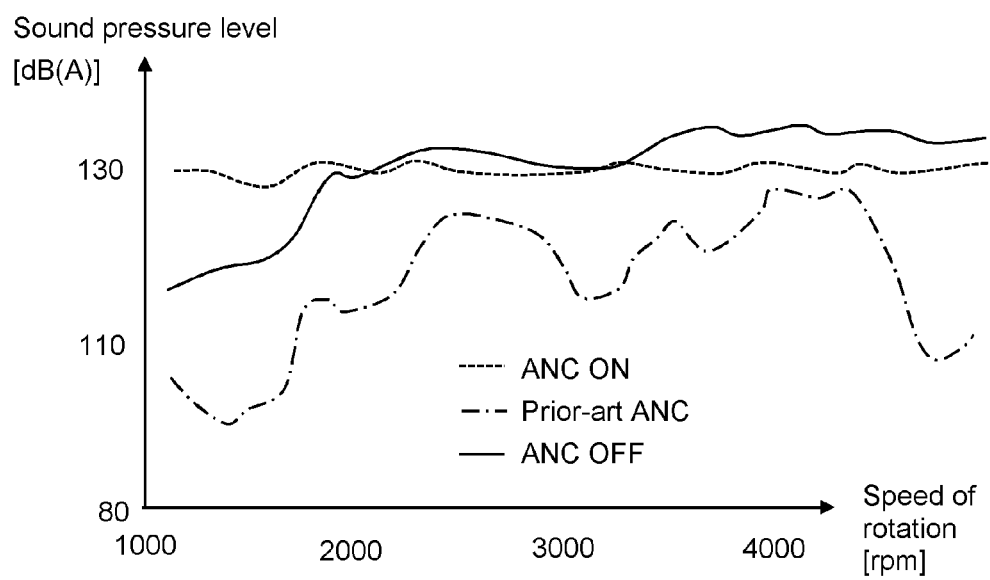
FIG. 10 is a schematic view showing the time curve of a sound pressure level with the use of the system from FIG. 6.

The behavior of the system and method according to the present invention is compared in FIG. 10 at high sound pressure levels, at which the sound generators used reach their performance limit, with a system from the state of the art. As is seen, it is possible by means of the present invention (ANC ON) to maintain the sound pressure level at an extensively constant value, compared to the unmanipulated sound (ANC OFF), at a predefined value Δ (here about 130 dB) and to either raise the outputted sound (up to about 2,000 rpm) or reduce it (above about 2,000 rpm) or to keep it more or less constant (in the range around 3,200 rpm) for this. The system from the state of the art (prior-art ANC) has, by contrast, a very nonuniform sound pressure level.

The present invention changes the conventional ANC system in a way that the system does not try to cancel noise completely, but to maintain a certain noise level. This noise level corresponds to the value Δ and can be set by the user. For instance, Δ "60" may result in a constant sound pressure of 60 dB, depending on the set-up of the system. Thus, if the skilled person intends to have a high sound level from the tail pipe he will set Δ to a high value. If the skilled person intends to have silence, he will set Δ to a low level. Thus the sound level coming from the tailpipe can be adjusted by a user by changing the value for Delta.

Figure 11A:
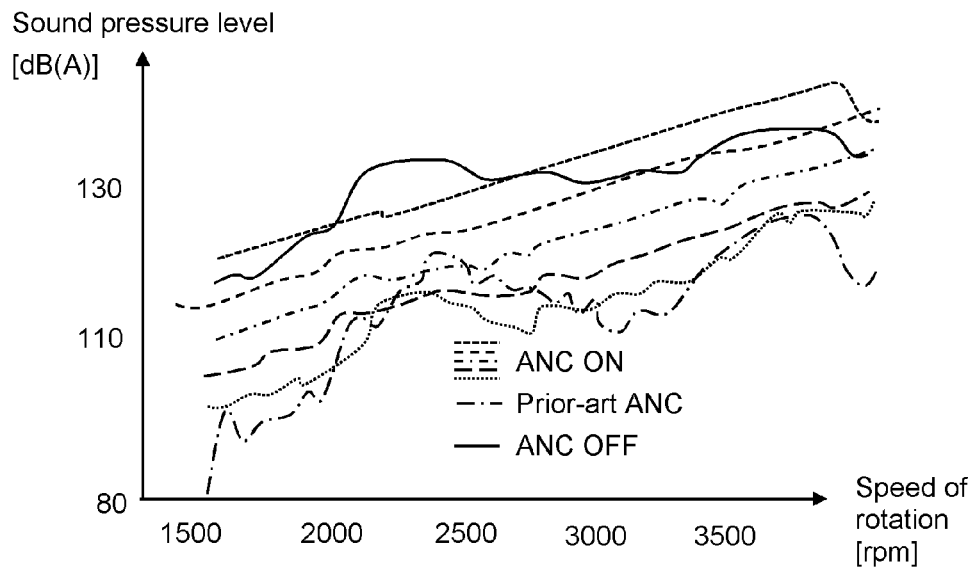
FIG. 11A is a time curve of a sound pressure level with the use of the system from FIG. 6 for different predefinable values.

FIG. 11A shows different measurement results as they were obtained with different data inputs of the system according to the present invention in the exhaust system of a diesel-powered vehicle. The predefined value Δ was maintained at a constant level but was increased linearly with the speed of rotation. The present invention (ANC ON) shows a substantially more quiet curve of the pressure level compared to the state of the art (ANC according to the state of the art) in this case as well. Depending on the data input, the sound pressure level is raised and/or lowered compared to the unmanipulated sound (ANC OFF) here as well.

Figure 11B:
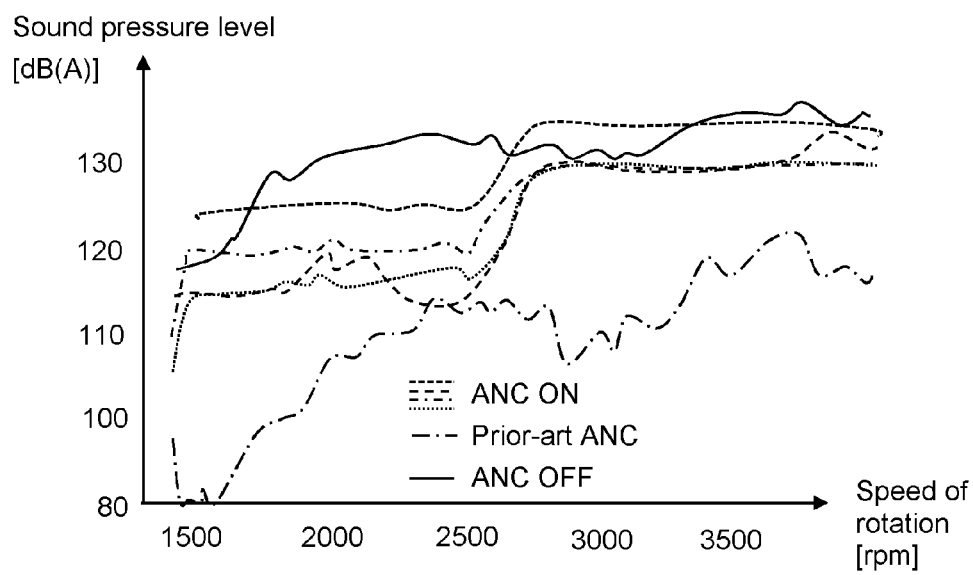
FIG. 11B is a time curve of a sound pressure level with the use of the system from FIG. 6 for different predefinable values.

FIG. 11B likewise shows different measurement results as they were obtained with different data inputs of the system according to the present invention in the exhaust system of a diesel-powered vehicle. The predefined value Δ was not maintained at a constant level, but it was maintained constantly at a first, relatively low value up to about 2,600 rpm and raised to a higher value above 2,600 rpm.

Figure 12A:
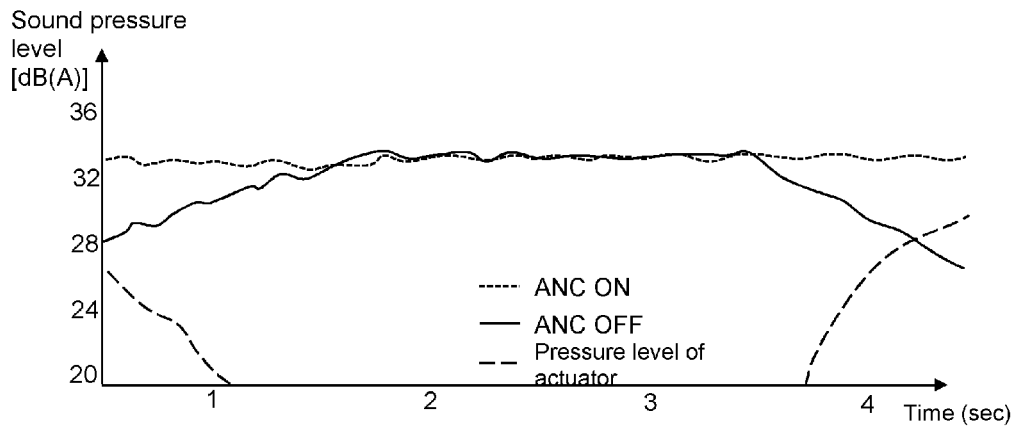
FIG. 12A is a time curve of a sound pressure level with the use of the system from FIG. 6 when passive measures are additionally taken to influence the sound.
Figure 12B:
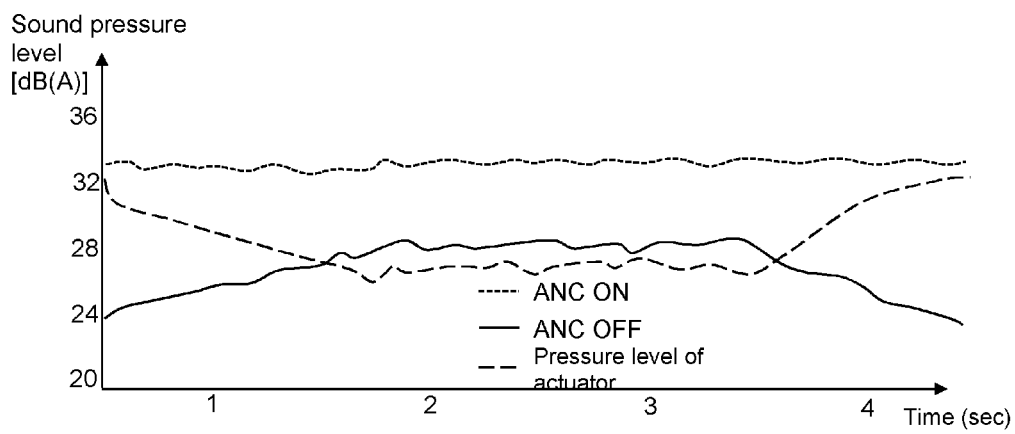
FIG. 12B is a time curve of a sound pressure level with the use of the system from FIG. 6 when passive measures are additionally taken to influence the sound.
Figure 12C:
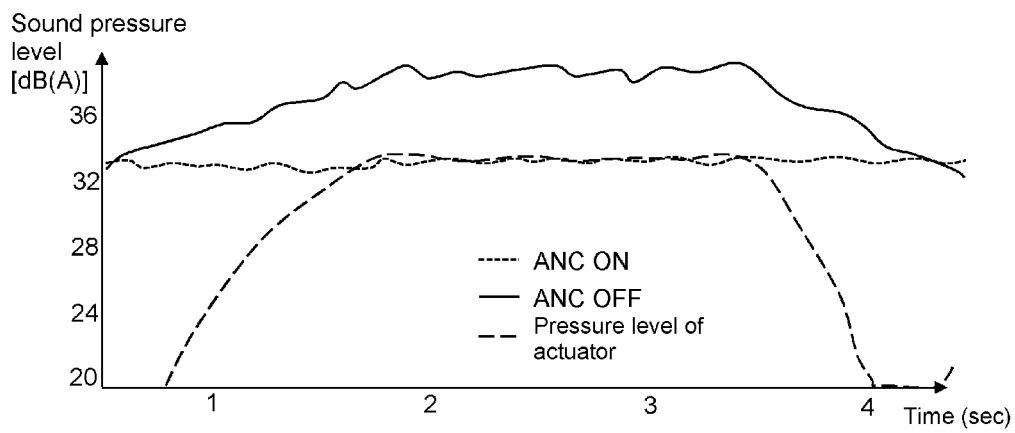
FIG. 12C is a time curve of a sound pressure level with the use of the system from FIG. 6 when passive measures are additionally taken to influence the sound.

FIGS. 12A, 12B and 12C show how the use of the system according to the present invention can be demonstrated. The speed of rotation of an internal combustion engine was first increased over time linearly from 1,200 rpm to 2,000 rpm, maintained at a constant value for some time and then lowered linearly again. The sound pressure level for the third engine harmonic was measured.

FIGS. 12A through 12C each show the curve of the sound pressure level with the system switched on (ANC ON) and switched off (ANC OFF) as well as the pressure level of the actuator with the system switched on. As can be seen, the system according to the present invention brings about an extensively constant sound pressure level of about 33 dB.

The exhaust system was mechanically muffled in FIG. 12B compared to FIG. 12A and was thus made less loud by about 4 dB. As is seen, this mechanical muffling causes no change in the fact that the system according to the present invention brings about an extensively constant sound pressure level of about 33 dB. At the same time, more energy is needed for the actuator, because the sound pressure level must be raised compared to the switched-off system. This effect does not occur in conventional systems.

The exhaust system was made mechanically louder in FIG. 12C by about 4 dB. As is seen, this causes no change in the fact that the system according to the present invention brings about an extensively constant sound pressure level of about 33 dB.

The present invention can thus be demonstrated in vehicles powered by means of internal combustion engines with the following method:

With the system switched off, the sound pressure level is measured first by means of an error microphone in the exhaust system downstream of the area of the superimposition under controlled conditions (e.g., with a speed ramp from 800 to 4,500 revolutions per minute at a constant load of 50%).

The sound pressure level is subsequently measured with the same error microphone under the same conditions with the system switched on. At the same time, the excitation of the actuator (sound generator) is measured. Some stationary operating points of the measured curves are selected.

The geometry of the passive exhaust system is now modified by mechanical measures such that the sound pressure level measured by means of the error microphone becomes less or more loud (by about 3 dB).

The measurement is subsequently repeated with the system switched on for the stationary operating points. The measured signals are filtered specifically according to their engine harmonics.

If the present invention is used, the mechanical manipulation with the exhaust system should not lead to instability of the system for influencing sound. Further, with the system switched on, the sound pressure level measured with the error microphone should correspond in case of the mechanically manipulated system, taking certain tolerances into account, to the sound pressure level measured with the error microphone in the mechanically unmanipulated system (for the stationary operating points).

While specific embodiments of the invention have been shown and described in detail to illustrate the application of the principles of the invention, it will be understood that the invention may be embodied otherwise without departing from such principles.

What is claimed is:

1. A system for actively influencing sound, the system comprising:
    a sound generator configured to generate sound when an audio signal is sent to the sound generator and to superimpose the sound generated by the sound generator to a sound to be manipulated;
    an error sensor configured to measure superimposed sound, which is obtained from the superimposition of the sound generated by the sound generator to the sound to be manipulated and to output a corresponding feedback signal;
    a signal generator configured to generate and output a sound signal;
    a controller configured to generate a first control signal and a second control signal;
    an adder configured to subtract the second control signal from the feedback signal and to output a modified feedback signal, obtained, to the signal generator; and
    a weighter configured to weight the sound signal outputted by the signal generator with a first control signal generated by the controller and to output a weighted sound signal to generate the audio signal;
    wherein the signal generator is configured to generate the sound signal as a function of the modified feedback signal; and
    wherein the controller is configured to generate the first and second control signals such that the value of the amplitudes of the feedback signal corresponds to a predefinable value.

2. A system in accordance with claim 1,
    wherein the controller is configured to generate the first and second control signals with the use of a basic control signal, wherein the basic control signal represents a value from a sequence of rational numbers greater than or equal to zero,
    wherein the basic control signal corresponds to a quotient of the predefinable value to a value of the amplitudes of the signal generated by the sound generator if the value of the amplitudes of the signal generated by the sound generator is greater than a threshold value greater than zero, and
    wherein the basic control signal corresponds to a predefined maximum if the value of the amplitudes of the signal generated by the sound generator is lower than or equal to the threshold value.

3. A system in accordance with claim 2, wherein the controller is configured to generate the first control signal from the difference from one and the basic control signal.

4. A system in accordance with claim 2, wherein the controller is configured to generate the second control signal from the product of the basic control signal and a signal generated by the sound generator at an earlier time.

5. A system in accordance with claim 4, wherein the earlier times of the signal generated by the sound generator precede the basic control signal by one internal clock frequency or multiples of an internal clock frequency of the signal generator.

6. A system in accordance with claim 2, wherein the controller is configured to determine the signal generated by the sound generator by convoluting a transfer function of the sound generator with the weighted sound signal weighted by the weighter.

7. A system in accordance with claim 6, wherein the controller is configured to use an estimated transfer function which is stored in the controller, instead of the transfer function of the sound generator, in order to obtain an estimate for the signal generated by the sound generator.

8. A system in accordance with claim 1, wherein the generator is further configured to receive an input wave vector, which input wave vector depends on the sound to be manipulated, and to generate the sound signal as a function of the input wave vector.

9. A system in accordance with claim 8, wherein the input wave vector is representative of at least one of the following speed of rotation or engine load or torque of an engine, which generates the sound to be manipulated,
    an accelerator position or an accelerator gradient, wherein the accelerator controls an engine, which generates the sound to be manipulated,
    a state of a clutch or a transmission, which are connected to an engine, which generates the sound to be manipulated,
    a mode of operation of an engine, which generates the sound to be manipulated,
    a voltage of a battery connected to an engine, which generates the sound to be manipulated, and
    an operating state of an engine, which generates the sound to be manipulated.

10. A system in accordance with claim 8,
    further comprising a microphone, which measures the sound to be manipulated and outputs a measured signal corresponding to the measured sound to be manipulated, wherein the signal generator is further configured to generate the sound signal by taking into account the measured signal, which is outputted by the microphone; and/or a user interface which is configured to receive a user input, wherein the signal generator is further configured to generate the sound signal by taking into account the user input, which is received via the user interface and/or wherein the signal generator can be connected to an engine control of an engine and is configured to generate the sound signal by taking into account signals that are received from the engine control.

11. A motor vehicle comprising:
an internal combustion engine with an engine control; and
a system comprising:
a sound generator configured to generate sound when an audio signal is sent to the sound generator and to superimpose the sound generated by the sound generator to a sound to be manipulated;
an error sensor configured to measure superimposed sound, which is obtained from the superimposition of the sound generated by the sound generator to the sound to be manipulated and to output a corresponding feedback signal;
a signal generator configured to generate and output a sound signal;
a controller configured to generate a first control signal and a second control signal;
an adder, configured to subtract the second control signal from the feedback signal and to output a modified feedback signal obtained to the signal generator; and
a weighter, configured to weight the sound signal outputted by the signal generator with a first control signal generated by the controller and to output a weighted sound signal to generate the audio signal;
wherein the signal generator is configured to generate the sound signal as a function of the modified feedback signal; and
wherein the controller is configured to generate the first and second control signals such that the value of the amplitudes of the feedback signal corresponds to a predefinable value,
wherein the control is connected to at least one of the signal generator and the controller and is configured to determine the at least one of a speed of rotation, an engine load and a torque of the internal combustion engine and to output same as an input wave vector to the signal generator and/or controller.

12. A method for actively influencing sound, having the steps of:
generating a sound signal;
measuring a superimposed sound, which is obtained from the superimposition of sound generated as a function of the sound signal to a sound to be manipulated in order to obtain a corresponding feedback signal;
generating a basic control signal, wherein the basic control signal represents a value of a sequence of rational numbers greater than or equal to zero, wherein the basic control signal corresponds to a quotient of a predefinable value to a value of the amplitudes of a signal generated by a sound generator, if the value of the signal generated by the sound generator is greater than a threshold value greater than zero, and wherein the basic control signal corresponds to a predefined maximum if the value of the amplitudes of the signal generated by the sound generator is lower than or equal to the threshold value;
generating a first control signal from the difference from one and the basic control signal and generating a second control signal from the product of the basic control signal and a signal, which corresponds to a sound generated at an earlier time as a function of the sound signal;
weighting the sound signal with the first control signal to obtain a weighted signal;
subtracting the second control signal from the feedback signal in order to obtain a modified feedback signal, wherein the sound signal is generated in the step of generating the sound signal by using the modified feedback signal; and
using the weighted sound signal to generate the sound generated as a function of the sound signal.

13. A system for actively influencing a primary sound, the system comprising:
a sound generator generating a secondary sound as a function of a final sound signal y'(n) received by said sound generator;
an acoustic area receiving the primary sound and receiving the second sound from said sound generator, said acoustic area mixing the primary and secondary sound to create a superimposed sound;
an error sensor measuring the superimposed sound from said acoustic area and creating a feedback signal corresponding to the superimposed sound;
a controller generating a first control signal and a second control signal;
an adder subtracting the second control signal from the feedback signal to create a modified feedback signal;
a signal generator receiving the modified feedback signal and generating an initial sound signal as a function of the modified feedback signal;
an amplifier receiving the initial sound signal from said signal generator and receiving the first control signal from said controller, said amplifier amplifying the initial sound signal as a function of the first control signal to generate the final sound signal, said amplifier sending the final sound signal to said sound generator to generate the secondary sound;
said controller generating the first and second control signals to have a value of amplitudes of the feedback signal correspond to a predefined value.

14. A system in accordance with claim 13, wherein:
said controller generates a basic control signal;
said controller determines a value of the amplitudes of the secondary sound generated by the signal generator;
when the value of the amplitudes of the secondary sound is greater than a threshold value then the basic control signal corresponds to a quotient of the predefined value to a value of the amplitudes of the secondary sound generated by the signal generator;
when the value of the amplitudes of the secondary sound is less than the threshold value then the basic control signal corresponds to a predefined maximum control signal;
said control signal generates the first and second control signals as a function of the basic control signal.

15. A system in accordance with claim 14, wherein:
said controller generates the first control signal as 1 minus the basic control signal.

16. A system in accordance with claim 14, wherein:
said controller generates the second control signal as a the product of the basic control signal and the secondary sound generated by signal generator at an earlier time.

17. A system in accordance with claim 16, wherein:
the earlier time of the secondary sound precedes the basic control signal by one internal clock frequency or multiples of an internal clock frequency of the signal generator.

18. A system in accordance with claim 14, wherein:
said sound generator has a transfer function that converts the final sound signal into the secondary sound;
said controller determines a value of the amplitudes of the secondary sound based on the initial sound signal $y(n)$ and the transfer function of the sound generator.

19. A system in accordance with claim 18, wherein:
said controller uses an estimate of the transfer function which is stored in said controller in order to obtain an estimate for the secondary sound generated by the sound generator.

20. A system in accordance with claim 13, wherein:
said signal generator is adapted to receive an input wave vector describing the primary sound, said signal generator generates the sound signal as a function of the input wave vector.

21. A system in accordance with claim 20, wherein:
the input wave vector includes one of:
a speed of rotation of an engine which generates the primary sound;
an engine load of an engine which generates the primary sound;
a torque of an engine which generates the primary sound;
an accelerator position of an accelerator which controls an engine which generates the primary sound;
an accelerator gradient of an accelerator which controls an engine which generates the primary sound;
a state of a clutch connected to an engine which generates the primary sound;
a state of or a transmission connected to an engine which generates the primary sound;
a mode of operation of an engine which generates the primary sound;
a voltage of a battery connected to an engine which generates the primary sound; and
an operating state of an engine which generates the primary sound.

22. A method for actively influencing a primary sound to create a desired sound, the method comprising the steps of:
generating a secondary sound;
superimposing the secondary sound on the primary sound to create a superimposed sound;
measuring the superimposed sound to obtain a feedback signal;
determining a value of the amplitudes of the secondary sound;
receiving a predefined value representing the desired sound;
generating a basic control signal to have a value of amplitudes of the feedback signal correspond to the predefined value, said generating including,
when the value of the amplitudes of the secondary sound is greater than a threshold value, then the basic control signal corresponds to a quotient of the predefined value to a value of the amplitudes of the secondary sound generated by the signal generator;
when the value of the amplitudes of the secondary sound is less than the threshold value, then the basic control signal corresponds to a predefined maximum control signal;
generating a first control signal as 1 minus the basic control signal;
generating a second control signal from a product of the basic control signal and the secondary sound generated at an earlier time;
subtracting the second control signal from the feedback signal in order to obtain a modified feedback signal;
generating a sound signal as a function of the modified feedback signal;
weighting the sound signal with the first control signal to obtain a weighted sound signal;
using the weighted sound signal in said generating of the secondary sound;
said superimposing of the secondary sound with the primary sound creating the desired sound.

* * * * *